Figure 1:
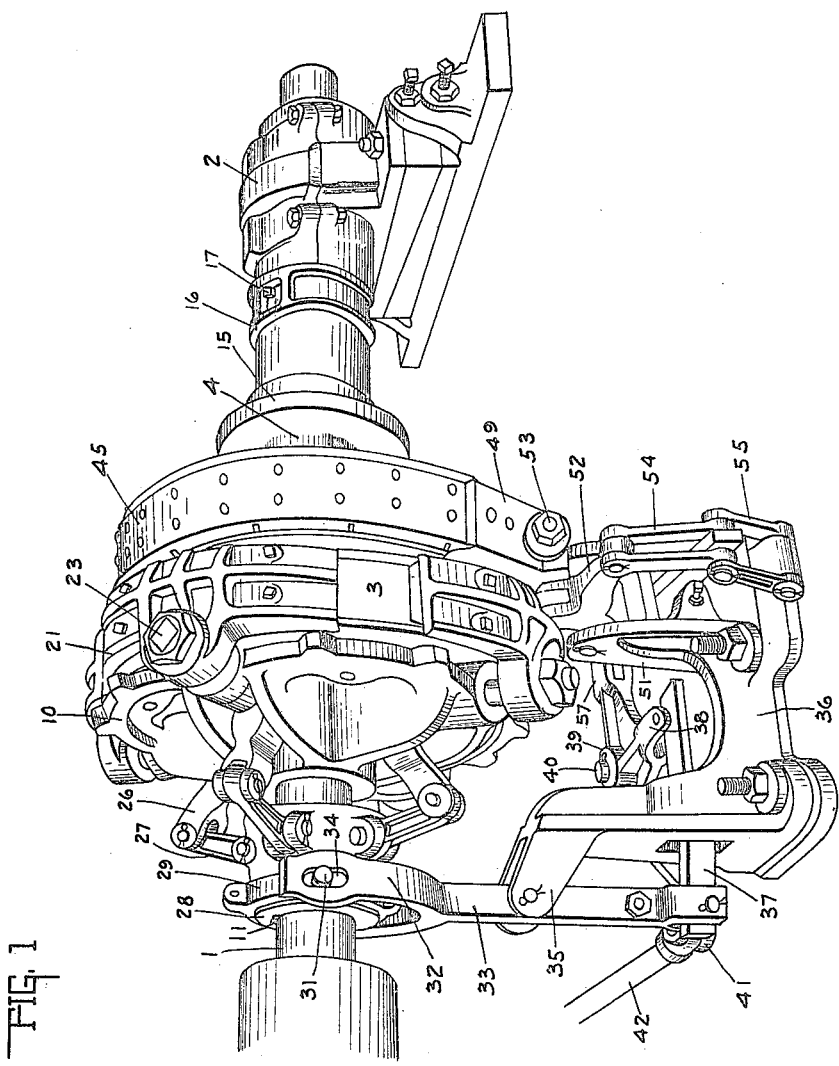

T. R. LIVINGSTON.
REVERSE CLUTCH MECHANISM.
APPLICATION FILED APR. 7, 1919.

1,372,759.

Patented Mar. 29, 1921.
4 SHEETS—SHEET 1.

INVENTOR.
TROY R. LIVINGSTON
BY
*Lockwood & Lockwood*
ATTORNEYS.

INVENTOR.
TROY R. LIVINGSTON

T. R. LIVINGSTON.
REVERSE CLUTCH MECHANISM.
APPLICATION FILED APR. 7, 1919.
1,372,759.
Patented Mar. 29, 1921.
4 SHEETS—SHEET 3.
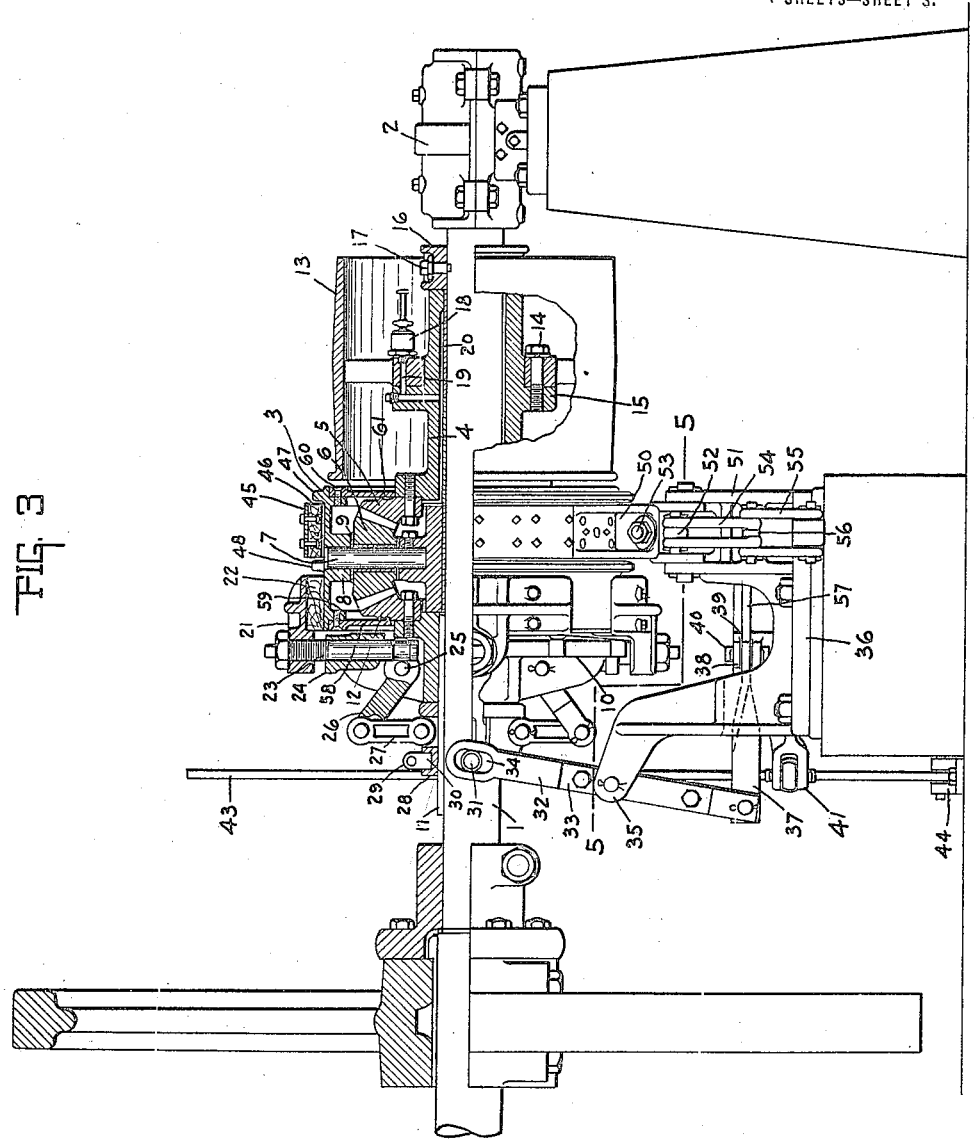
INVENTOR.
TROY R. LIVINGSTON.
BY
*Lockwood & Lockwood*
ATTORNEYS T. R. LIVINGSTON.
REVERSE CLUTCH MECHANISM.
APPLICATION FILED APR. 7, 1919.
1,372,759.
Patented Mar. 29, 1921.
4 SHEETS—SHEET 4.
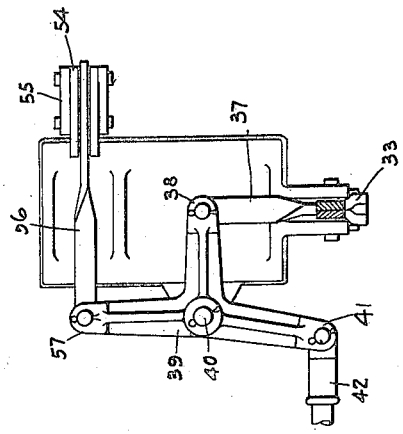
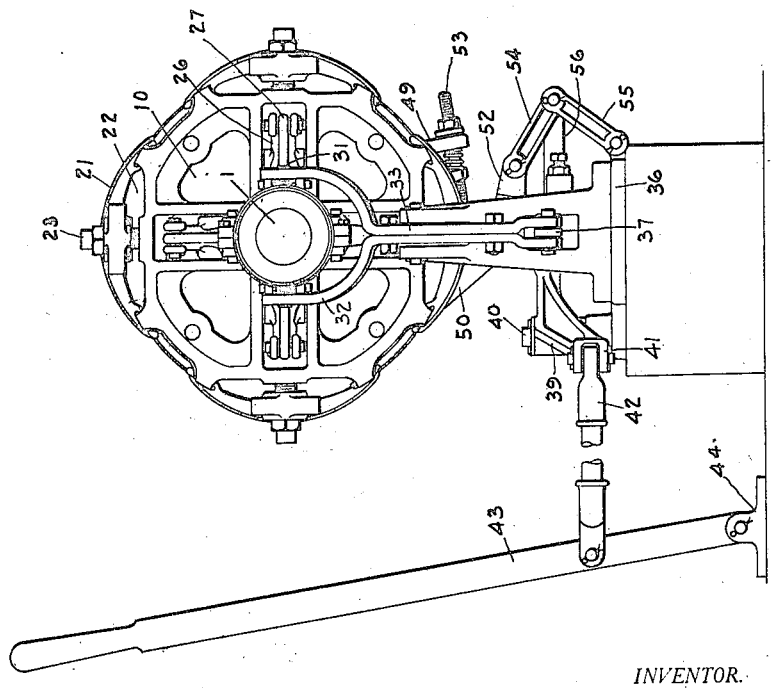
INVENTOR.
TROY R. LIVINGSTON.
BY
ATTORNEYS

UNITED STATES PATENT OFFICE.

TROY R. LIVINGSTON, OF MUNCIE, INDIANA, ASSIGNOR TO MUNCIE OIL ENGINE COMPANY, OF MUNCIE, INDIANA, A CORPORATION.

REVERSE CLUTCH MECHANISM.

1,372,759.  Specification of Letters Patent.  Patented Mar. 29, 1921.

Application filed April 7, 1919. Serial No. 288,145.

*To all whom it may concern:*

Be it known that I, TROY R. LIVINGSTON, a citizen of the United States, and a resident of Muncie, county of Delaware, and State of Indiana, have invented a certain new and useful Reverse Clutch Mechanism; and I do hereby declare that the following is a full, clear, and exact description thereof, reference being had to the accompanying drawings, in which like numerals refer to like parts.

This invention relates to reverse clutch mechanism and is used chiefly in connection with oil and gas engines, either stationary or portable.

One feature of the invention is the provision of a grease tight casing for inclosing grease in the friction drum, whereby the drum may be packed with grease and the gearing therein kept lubricated for an indefinite period without replenishing the lubricant or grease.

A further feature of the invention is in placing the forward drive and reverse drive on the same side of the clutch pulley thus requiring but one friction drum and which permits different sized pulleys to be successively applied to the clutch pulley as desired without dismantling any parts of the clutch mechanism proper.

A further feature of the invention is in so arranging the parts of the clutch mechanism that the driving belt will be prevented from moving either into the reverse or brake band or the drive jaws or blocks of the clutch mechanism.

A further feature of the invention is in so arranging the diameter of the pulley as to dispense with belting back through the jack shaft and then to the driven pulley.

A further feature of the invention is the provision of an independent fulcrum base under the brake band and drive jaws, which provides for an accurate and positive adjustment which will not be influenced by vibrations due to the operation of the parts of the clutch mechanism, the fulcrum base being arranged so that the clutch may be very compact and also will be anchored without the addition of the usual tie rods.

A further feature of the invention is in so arranging the shaft lever and toggle links for operating the clutch mechanism as to render the motion positive, and is so constructed that the operating lever therefor may be placed at either side of the shaft or in the front or rear of the machine as occasion may require.

Figure 2:
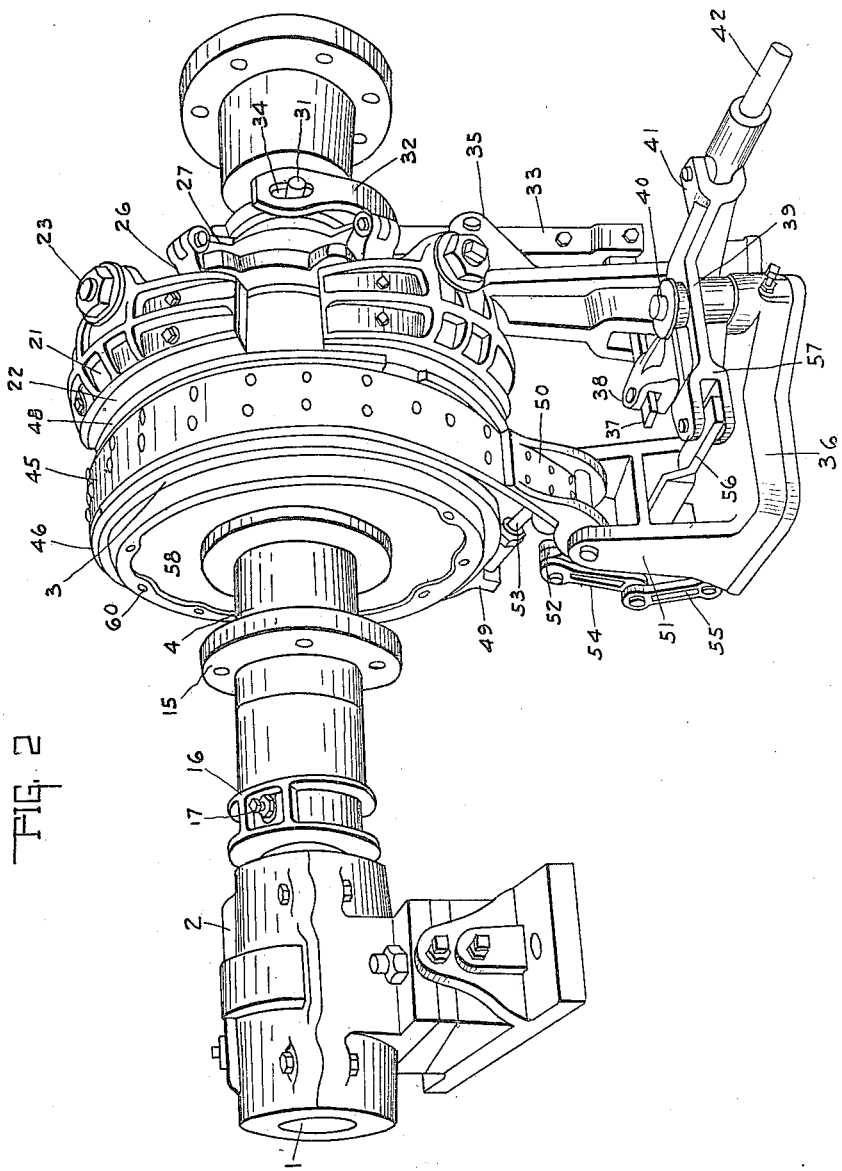

Referring to the drawings, which are made a part of this application, Figure 1 is a perspective view of a reverse clutch mechanism. Fig. 2 is a similar view of the reverse clutch mechanism looking from the opposite direction. Fig. 3 is a front elevational view of the reverse clutch mechanism, with the upper half in section, and other parts broken away to show parts in detail. Fig. 4 is an end elevational view of the reverse clutch mechanism. Fig. 5 is a sectional view as seen on line 5—5 Fig. 3.

Referring to the drawings, in which similar reference numerals designate corresponding parts throughout the several views, 1 indicates a driving shaft which is mounted in suitable bearings 2, but one of the bearings being shown. Mounted upon the shaft 1 is the improved reverse clutch mechanism comprising a friction drum 3, which is rotatably mounted upon the shaft 1, and adapted to rotate with or independently thereof. At one side of the friction drum 3 is a pulley hub 4, which is likewise rotatably mounted upon the shaft 1, and is provided at one end with a beveled gear 5, said gear being fixed to the pulley hub and in position to coöperate with beveled pinions 6 mounted upon the shafts 7 carried by the friction drum 3, the web 8 of the friction drum having transverse openings 9 through which the bevel pinions 6 extend, the shafts 7 projecting inwardly from the peripheral face of the drum.

Coöperating with the opposite end of the friction drum 3 is a clutch spider 10 which is fixed to the shaft 1 through the medium of a key 11 and is caused to rotate with the shaft. The inner face of the spider 10 is also provided with a bevel gear 12 similar to the bevel gear 5, which also meshes with the bevel pinions 6, and through said bevel gears and bevel pinions reverse rotation is imparted to the clutch pulley 13 which is removably attached to the pulley hub 4 in any suitable manner as by means of bolts 14. The hub 4 is provided in its length with a circular flange 15 into which the ends of the bolts 14 are threaded to secure the pulley 13 to the hub 4, and by so attaching the pulley the same may be removed and a different size pulley placed thereon without disturbing any of the parts of the clutch mechanism. The hub 4 is held in place on the shaft 1 by means of a thrust collar 16 which abuts against the outer end of the hub and is held in its adjusted position by means of a set screw 17. If desired a grease cup 18 may be attached to the pulley and lubricant therefrom pass through bores 19 and 20 on to the shaft 1 thereby maintaining the proper lubrication between the pulley hub and shaft.

In order to drive the pulley in the same direction in which the shaft 1 is rotating, or in forward direction, a plurality of clutch shoes 21 are arranged around the periphery of the drum 3 at one end thereof, each shoe having a block 22 attached thereto which, when the clutch shoes are moved inwardly, grips the face of the drum 3 and causes the drum to rotate with the spider 10. The clutch shoes 21 are adjustably mounted upon studs 23, which studs are slidably mounted through bearings 24 on the spider 10, said studs having trunnions 25 at their inner ends to which are pivotally attached toggle levers 26, the opposite ends of said toggle levers being in turn pivotally attached to toggle links 27, the toggle links likewise being pivotally attached to a sleeve 28 slidably mounted upon the shaft 1 and caused to rotate with the shaft by the key 11, the key being of sufficient length to permit longitudinal movement of the sleeve on the shaft 1 without becoming disengaged from the key.

The sleeve 28 is moved longitudinally of the shaft 1 by placing a yoke 29 around the periphery of the sleeve 28, which yoke enters a peripheral channel 30 in the sleeve, the yoke 29 having trunnions 31 on opposite sides thereof with which engage the bifurcated arms 32 of the shift lever 33, the bifurcated arms 32 having elongated slots 34 through which the trunnions 31 extend. The shift lever 33 is pivoted to a bracket 35 at a point between its ends, said bracket extending upwardly from a control fulcrum 36, and the lever 33 is rocked on its pivot by attaching one end of the control link 37 to the lower end of the lever 33, the opposite end of said link being attached to one arm 38 of a bell crank lever 39, which bell crank lever is likewise pivoted to a stud 40 on the control fulcrum 36 (see Figs. 2, 3 and 5). The bell crank lever construction 39 is provided with a lever arm 41 to which is attached one end of a pitman 42, the opposite end of said pitman being attached to a clutch operating lever 43 which has its lower end attached to a stationery fulcrum 44.

The clutching mechanism coöperates with the surface of the friction drum 3 at one end thereof, the clutching blocks 22 extending substantially around said drum and along but one-half the width of the friction drum, while coöperating with the outer surface of the opposite end of the friction drum is a brake band 45, to the inner face of which is attached a block 46 for contact with the peripheral surface of the friction drum, the brake band structure being held against lateral movement by providing ribs 47 and 48 on the periphery of the friction drum, thus forming a channel in which the brake block 46 rests.

Attached to the opposite ends of the brake band 45 are lugs 49 and 50, the lug 50 being pivoted between stationary ears 51 projecting upwardly from the control fulcrum 36, while the lug 49 is attached to one end of a rocking lever 52 by means of an attaching bolt 53, the rocking lever 52 being in turn pivoted on the same pin as the lug 50 so as to have independent movement of said lug 50.

The rocking lever 52 is operated for engaging the brake band 45 with the face of the friction drum 3 or for disengaging the same therefrom, by attaching toggle links 54 to the free end of the rocking lever 52, the opposite ends of said links being attached to toggle links 55, which are in turn attached to the control fulcrum 36. The toggle links 54 and 55 are operated through the medium of a control link 56 which is pivoted to said toggle links at their point of connection with each other, the opposite end of the control link being pivotally attached to an arm 57 of the bell crank lever 39.

In order to retain lubricant within the friction drum 3 the ends of said drum are closed by means of plates 58, the peripheral edges of which are attached to inwardly extending flanges 59 on the interior of the friction drum 3 by means of screws 60, the inner faces of said plates 58 bearing against the outer faces of the bevel gears 5 and 12 at the opposite ends of the friction drum respectively, said gears having in their faces meeting the faces of said plates, channels in which is placed any suitable form of packing 61.

This provides practically a grease tight casing for the gears within the friction drum so that by packing the interior of the friction drum with grease the gears will be properly lubricated for an indefinite time, thus obviating the necessity of constantly oiling these parts.

The bell crank lever 39 and the parts operating the same are so arranged that when shifted to neutral position the friction drum and pulley 13 will remain idle. When the pulley 13 is driven forward or caused to rotate in the same direction as the shaft 1, the lever 43 is swung away from the clutch mechanism its full distance, which will move the sleeve 28 inwardly and clamp the blocks 22 of the clutch shoe firmly in engagement with the surface of the friction drum 3 through the medium of the toggle levers 26 and 27 and adjusting studs 23, this action also opening the brake band its full distance so that it will be free of the friction drum. As the spider 10 and sleeve 28 are fixed to the shaft 1, the friction drum 3 will be rotated with the shaft 1, and in view of the fact that the bevel pinions 6, carried by the friction drum, are in mesh with the bevel gears 5 and 12 the pulley hub 4 and pulley 13 attached thereto, will be driven with the friction drum, consequently all of said parts will rotate with the shaft 1.

In order to reverse the rotation of the pulley 13 without effecting the rotation of the shaft 1, the lever 43 is thrown its full distance in the opposite direction or toward the clutch mechanism, which will result in releasing the shoe blocks 22 from the face of the friction drum and in clamping the block 46 of the brake band 45 in engagement with the surface of the friction drum 3, and as said brake band is non-rotatable, the friction drum will likewise be held against rotation. In consequence thereof, the bevel gear 12 will rotate independently of the friction drum and will impart rotating motion to the bevel pinions 6, and as the bevel gear 5 is also in mesh with said pinions, said gear 5 and the pulley attached thereto will be rotated in reverse movement to the rotation of the shaft 1, thereby reversing the movement of such machinery as the pulley 13 may be belted to without interrupting the rotation of the shaft.

The bell crank lever construction 39 is mounted upon the control fulcrum base 36 which is independent of the clutch mechanism so that the various levers connecting said fulcrum base and the clutch mechanism will not be affected by the vibration of the clutch mechanism, consequently when the various levers are shifted to any particular position they will remain in such adjusted position without requiring fastening means for holding them.

In this construction the combining of the clutch mechanism and the brake shoe permits of the positioning of the pulley 13 at one side thereof so that different size pulleys may be attached to the parts of the clutch mechanism without dismantling or disturbing any parts of the clutch mechanism.

It will likewise be seen that by providing a flange on the pulley hub 4 which remains fixed to parts of the clutch mechanisms and attaching the pulley proper to the flange of the hub through the medium of bolts 14, said clutch pulley 13 may be quickly attached to or disengaged from the pulley hub.

The invention claimed is:

1. In a clutch mechanism the combination with a drive shaft, a driven shaft, a pair of bevel gears positioned upon opposite ends of said shafts, and a bevel pinion between said gears, of a friction drum pivotally supporting said bevel pinion and rotatably mounted upon said drive shaft, clutch means positioned upon the exterior of said friction drum, brake means positioned adjacent said clutch means upon the exterior periphery of said friction drum, means closing the open ends of said drum, said closing means and said drum inclosing said bevel gears and pinion, said closing means including a hub member positioned upon the driven shaft, said hub member upon one face thereof supporting one of said bevel gears within said drum, a pulley positioned adjacent said drum, and means detachably securing said pulley to said hub.

2. In a reverse drive mechanism the combination with a friction drum, clutch means for driving said drum for rotation in one direction, brake means for gripping said drum and preventing the rotation thereof, and a bevel gear within said drum and rotatable in one direction when said clutch means is associated with said drum and rotatable in a reverse direction when said brake means is associated with said drum, of a hub member attached to said gear and supporting the same within said drum, a shaft supporting said hub member and said drum, a pulley supported upon said shaft and positioned adjacent said hub member and said drum, and means for adjustably securing said pulley to said hub member, and means limiting the longitudinal movement of said pulley and associated mechanism upon said shaft.

3. In a reverse clutch mechanism, the combination with a friction drum, clutch means associated therewith, brake means associated with said drum, gearing positioned within said drum, of means positioned adjacent said friction drum closing one end thereof and supporting a gear of said gearing, and means positioned adjacent said previously mentioned means to close the other end of said drum and support another gear of said gearing within the same, said first and second mentioned closing means forming a lubricating chamber within said drum in which said gears may operate.

4. In a clutch mechanism, the combination with a friction drum, of clutch shoes adapted to be engaged with the friction drum for causing the drum to rotate therewith, a brake band adapted to be engaged with said friction drum for holding the drum against rotation, a bell crank lever connected respectively with said clutch shoes and brake band and arranged to disengage one of said members from the friction drum when the other member is engaged therewith, and a lever for operating said bell crank lever, said levers being so mounted that when shifted to various positions they will remain in set positions without requiring retaining means.

In witness whereof, I have hereunto affixed my signature.

TROY R. LIVINGSTON.

Witnesses:
   EARL F. SMITH,
   WILLIAM F. LANGE.